United States Patent [19]

Tulinius

[11] Patent Number: 5,082,207
[45] Date of Patent: Jan. 21, 1992

[54] ACTIVE FLEXIBLE WING AIRCRAFT CONTROL SYSTEM

[75] Inventor: Jan Tulinius, Huntington Beach, Calif.

[73] Assignee: Rockwell International Corporation, El Segundo, Calif.

[21] Appl. No.: 554,094

[22] Filed: Jul. 16, 1990

Related U.S. Application Data

[63] Continuation of Ser. No. 698,061, Feb. 4, 1985, abandoned.

[51] Int. Cl.⁵ .................. B64C 3/44; B64C 13/16
[52] U.S. Cl. .................. 244/76 R; 244/203; 244/219; 244/195
[58] Field of Search .................. 244/75 R, 76 R, 76 C, 244/194, 195, 219, 218, 76 A, 46, 203

[56] References Cited

U.S. PATENT DOCUMENTS

| | | | |
|---|---|---|---|
| 3,310,261 | 3/1967 | Rogallo et al. | 244/44 |
| 3,734,432 | 5/1973 | Low | 244/75 A |
| 3,750,981 | 8/1973 | Prather | 244/16 |
| 3,811,642 | 5/1974 | Prather | 244/16 |
| 3,813,062 | 5/1974 | Prather | 244/16 |
| 3,857,535 | 12/1974 | Osder | 244/195 |
| 4,115,847 | 9/1978 | Osder et al. | 244/194 |
| 4,261,537 | 4/1981 | Tisdale, Sr. et al. | 244/295 |
| 4,327,437 | 4/1982 | Gelderloos | 244/194 |
| 4,330,100 | 5/1982 | Elber | 244/48 |
| 4,466,586 | 8/1984 | Burnham | 244/75 R |
| 4,472,780 | 9/1984 | Chenoweth et al. | 244/194 |
| 4,479,620 | 10/1984 | Rogers et al. | 244/75 |

OTHER PUBLICATIONS

Rockwell International, Highly Maneuverable Aircraft Technology.

*Primary Examiner*—Galen Barefoot
*Attorney, Agent, or Firm*—Charles T. Silberberg

[57] ABSTRACT

A system for controlling an aircraft by aeroelastic deflections of the wings which is effective beyond control surface reversal is disclosed. The system includes flexible wings, leading and trailing edge control surfaces attached to the wings, sensors to measure selected aircraft flight parameters, an information processing system to receive and process pilot command signals and signals from the sensors, and control mechanisms in the wing that respond to processed signals from the information processing system. The control mechanisms selectively position the control surfaces to produce loads such that the wings are deflected in a desired manner for aircraft control. The system can be used for aircraft control (including maintaining stability), optimum cruise, and maneuver performance. Augmentation can be added for maneuver load control, gust load alleviation, and flutter suppression.

40 Claims, 6 Drawing Sheets

ACTIVE FLEXIBLE WING AIRCRAFT CONTROL SYSTEM

This is a continuation of copending application Ser. No. 06/698,061 filed on Feb. 4, 1985, now abandoned.

BACKGROUND OF THE INVENTION a. Field of the Invention

This invention relates to control of an aircraft, and more specifically to control of an aircraft by deflecting the wings through controlled movements of wing control surfaces.

b. Description of the Prior Art

The control of high speed aircraft has been a major problem for aircraft designers. Aircraft with highly aft swept wings have poor control effectiveness, especially roll control, in the high dynamic pressure region. The difficulty of control of high speed aft swept wing aircraft in roll results from aeroelastic twist caused by trailing edge control surface deflections. Normally, wing control surfaces when differentially deflected create differential lift on the wing panels which results in a rolling moment. However, as a wing is flexible, the increase in differential lift caused by the trailing edge control surface deflections will also cause each wing to twist in a direction to reduce the differential lift. At high dynamic pressure flight conditions, the twisting due to aeroelastic effects is large. As a result, roll control surfaces must be deflected to a large degree to obtain the desired roll, thereby increasing actuation requirements which adds to aircraft weight and power system requirements. At a certain point, the effect can result in roll reversal or what is commonly known as aileron reversal. (The aircraft will actually roll in the opposite direction from the pilot's commands.) To maintain roll control effectiveness, the wings are traditionally stiffened and a rolling tail utilized. The addition of a rolling tail and increasing stiffness of the wings results in a heavier aircraft, reduced aerodynamic performance, and increased observables.

In U.S. Pat. No. 821, 393 to O. and W. Wright issued May 2, 1906, there is disclosed a maze of ropes and pulleys to twist the bi-plane wings to provide lateral stability. The wings being made from wood and covered with cloth were sufficiently flexible to allow for the desired twist. The pilot was positioned in a movable cradle to which the ropes were attached. Thus, the pilot by his lateral movement could cause rope movement and resulting wing twist. The Wright Brothers' object was to keep the wings level and control the lateral upset initiated by wind gusts. This practice has been made obselete by the current practice of aircraft control forces effected by control surface deflections with wing flexure minimized.

Another problem with high speed aircraft, is the necessity for making design compromises in the wings for effectiveness over the flight envelope. Aerodynamic requirements for different flight conditions vary. For example, optimal wing configuration for transonic maneuver and supersonic cruise are considerably different. Since current aircraft wings must normally be stiffened to provide roll control effectiveness, there is little that can be done to resolve this problem by variable aeroelastic twist. Mechanical devices to vary leading and trailing edge camber have been used in this regard, but only produce an inefficient compromise since the balance of the wing remains unaffected and aircraft weight, cost, and complexity are increased.

SUMMARY OF THE INVENTION

It is, therefore, an object of the present invention to provide a system for controlling an aircraft through aeroelastic deflections of the aircraft wings.

It is another object of this invention to provide a system that will minimize aircraft drag during cruise and maneuver.

It is another object of this invention to provide an aircraft control system that will yield improved control effectiveness during high dynamic pressure conditions and beyond control surface reversal.

It is still another object of this invention to provide an aircraft control system that will result in reduced weight, drag, and observables for the aircraft.

It is still another object of this invention to provide an aircraft control system which will automatically compensate for a damaged control surface.

It is yet another object of this invention to provide an aircraft control system which will vary the configuration of the aircraft wings by aeroelastically deflecting same into one which is desirable for the flight conditions.

Briefly, in accordance with this invention, there is provided a system for controlling an aircraft through aeroelastic deflections of the wings in all modes of flight. Movements of the leading edge and trailing edge wing control surfaces bring about the aeroelastic deflections of the flexible wings for control of the aircraft, optimum cruise, and specific maneuvers. The system can also effect gust load alleviation, flutter suppression, and maneuver load control. The system is responsive to pilot control signals and signals from sensors respresentative of selected aircraft flight parameters. A processing means responsive to the command and sensor signals provides control signals to actuators that move the leading and trailing edge control surfaces in a manner to cause selected aeroelastic deflections of the wings so that each of the wings has an overall contour which will produce the specific aircraft control desired. The system preferably incorporates an adaptive capability in the processing means that will compensate for a failure of a control surface. For example, if a control surface becomes disabled, the remaining control surfaces would immediately adapt to the loss and effect the desired aeroelastic wing deflections to maintain control of the aircraft with minimum drag.

Other objects and advantages of the invention will become apparent upon reading the following detailed description and upon reference to the drawings.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE INVENTION

Figure 1:
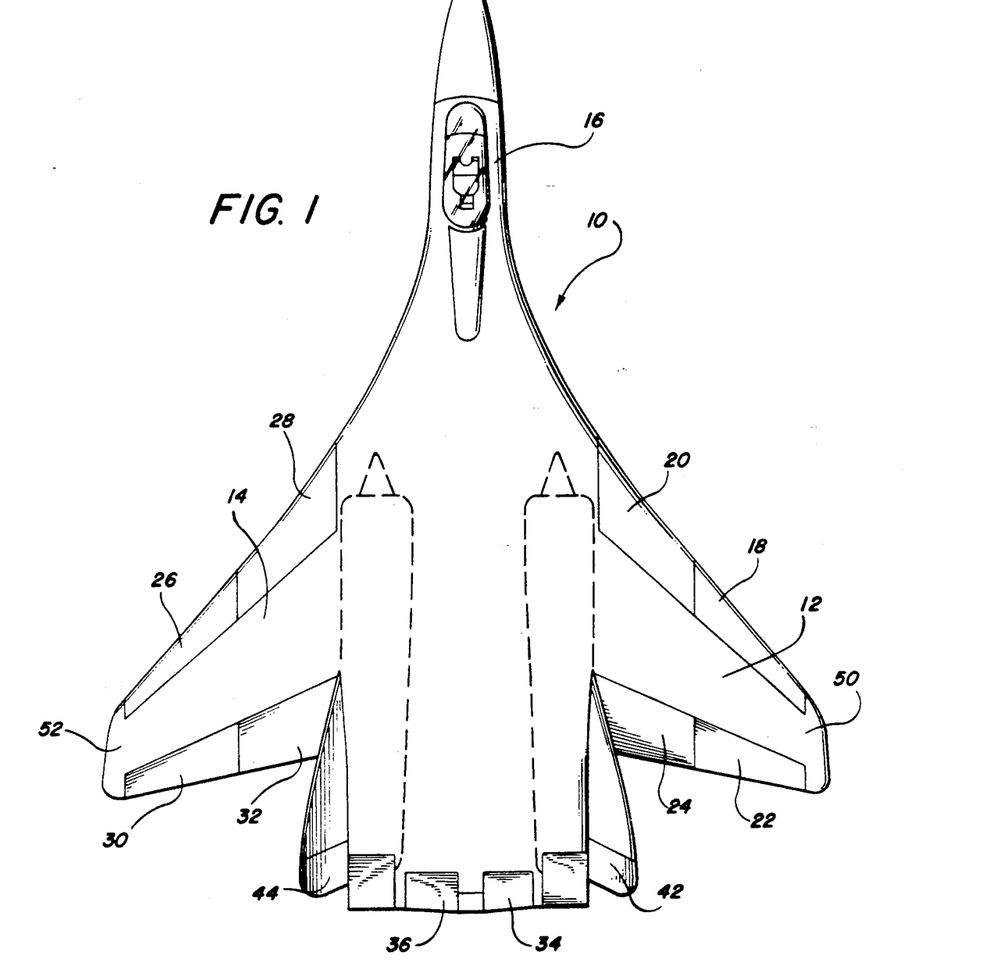
FIG. 1 is a plan view of an aircraft according to the present invention with active flexible adaptive wings.
Figure 2:
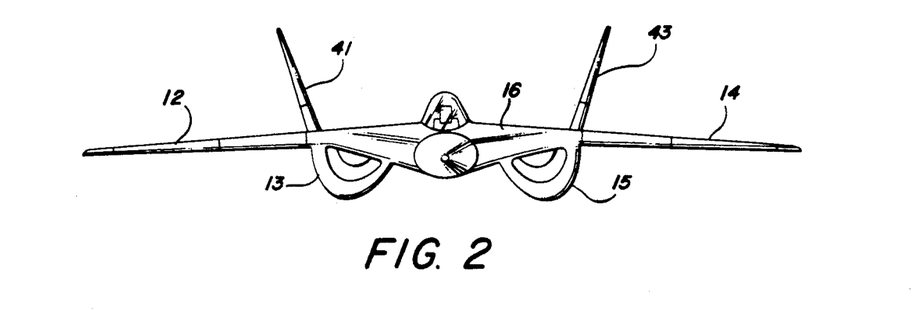
FIG. 2 is a front view of the aircraft of FIG. 1.

Referring now to FIGS. 1 and 2, there is shown an aircraft generally indicated at 10 having wings 12 and 14 and fuselage 16. Mounted on the fuselage are engine inlets 13 and 15. Wing 12 on the right or starboard side employs leading edge wing control surfaces 18 and 20 and trailing edge wing control surfaces 22 and 24. Wing 14 on the left or port side employs leading edge wing control surfaces 26 and 28 and trailing edge wing control surfaces 30 and 32. Also shown in FIG. 1 are body control surfaces 34 and 36 that primarily provide pitch control, and vertical tail control surfaces 42 and 44 that provide yaw control The yaw control surfaces are conventional in this embodiment. The control surfaces are mechanically movable in a conventional manner. However, the wing control surfaces are able to deflect above and below the corresponding wing.

It should be noted that the aircraft 10 does not include a horizontal tail. This is unnecessary with the present invention, thereby saving considerable weight and reducing aircraft observables. The tail structures 41 and 43 are shown as being somewhat inclined relative to the aircraft vertical axis, however, they are much closer to vertical than to horizontal and their primary function is as a vertical tail for yaw control, and not as a horizontal tail. Accordingly, by no horizontal tail is meant no tail structures which are substantially horizontal relative to the fuselage which have a primary purpose of acting as a horizontal tail.

While it is preferred that the aircraft 10 not have a horizontal tail, this is not a requirement. The system would still provide many of the advantages discussed herein for an aircraft having horizontal tails. Similarly, aircraft 10 does not employ canards. However, the present invention could advantageously be used whether or not the aircraft has such surfaces.

All aircraft wings are flexible to a certain degree. There must, however, be sufficient stiffness and strength in the wings, even with an active control, to withstand design loads, maneuver loads, gusts, and to prevent flutter. Composite materials have seen recent application for wings due to their high strength to weight ratio and capability for aeroelastic tailoring. It is for these reasons that in the preferred embodiment, the wings 12 and 14 of the present invention will be made of a composite material, such as graphite epoxy. However, other materials could be used if desired. Optimally the wing material used will provide a high degree of wing flexibility with sufficient strength and stiffness with active controls to meet the aforementioned design requirements.

Figure 3:
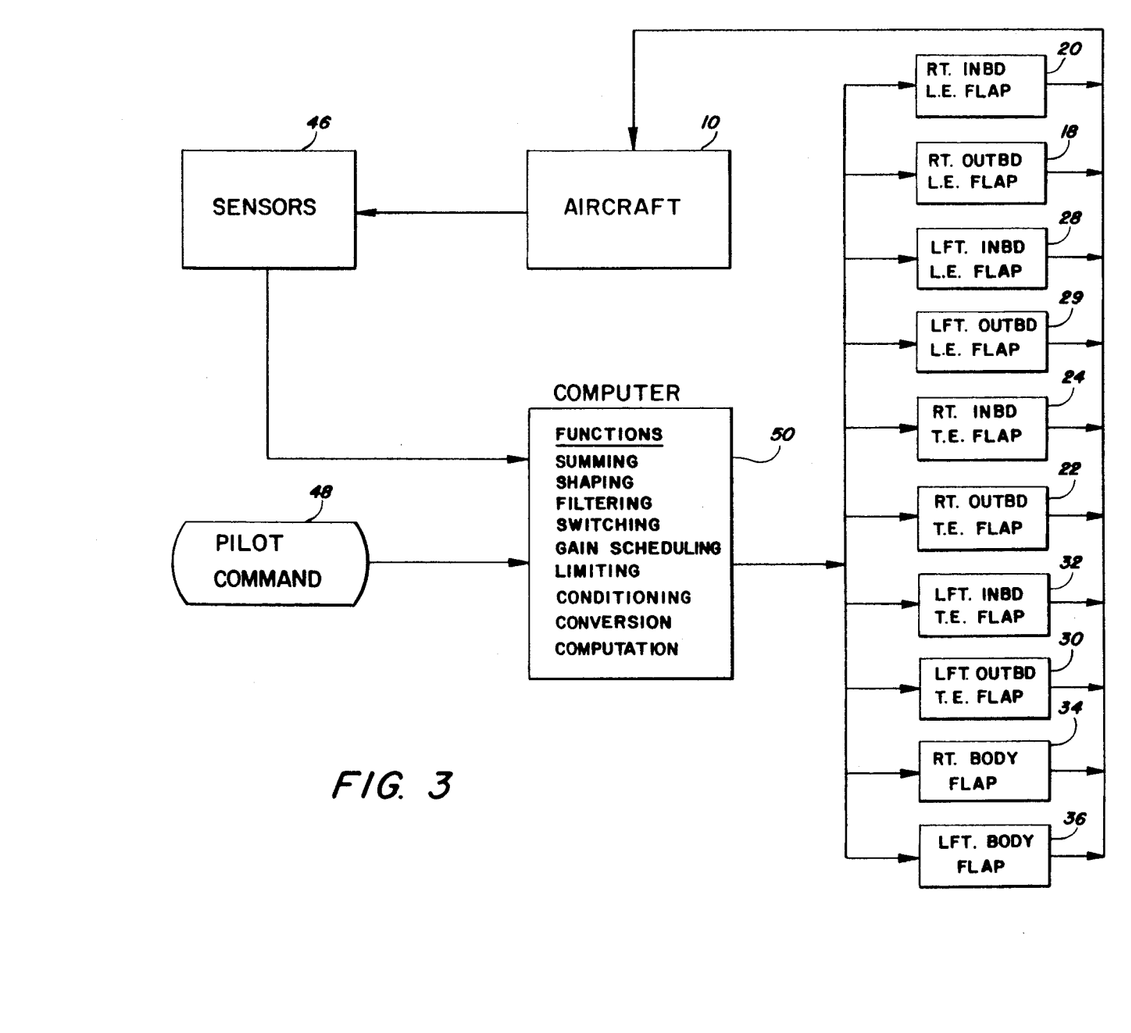
FIG. 3 is a block diagram of a control system according to the present invention.

Referring now to FIG. 3 there is shown a block diagram of a control system according to the present invention. When the pilot desires that the aircraft execute a particular control movement, a command signal 48 is generated (such as by stick movement) which is transmitted to computer 50. The command may be manual from the pilot or by automatic pilot. Computer 50 also receives signals from sensors 46, which are positioned on aircraft 10. Sensors 46 provide signals indicative of motion of the aircraft A number of parameters will be sensed in this regard These will preferably include aircraft attitude, fuselage motion (accelerometer readings), altitude, and mach number. With gain scheduling for the particular aircraft included in the computer memory, the command signal and sensor signals, after suitable shaping, filtering, switching, conditioning, converting, surface command limiting, and combining are computed to determine optimal flap movements to cause the aeroelastic wing flexure which would result in the desired control movement. Control signals from computer 50 are subsequently transmitted to actuators (not shown) for each of the respective flaps 18, 20, 22, 24, 28, 29, 30, 32, 34, and 36 which is to be rotated from its current position. Movement of these flaps produces aerodynamic loads on the wings 12 and 14 which cause the wings to deflect so that each of the wings 12 and 14 has an overall contour (in combination with the control surfaces thereon) that will produce the desired control movement. The control surface deflections are computed in computer 50 such that the optimum wing shape for wings 12 and 14 for minimum drag for the given flight condition are obtained to provide the desired control movement. It should be understood that the control surfaces are not used as the primary force producing devices, but as aerodynamic surfaces to control the aeroelastic deformation of the wings. It is the overall deflected contour of the wings that produces the desired control movement.

The control system can also be used for providing active longitudinal stability augmentation to the aircraft 10, which is particularly advantageous when there is no horizontal tail. This is accomplished in the same manner as described above with the exception that the computer 50 computes its control signals to maintain stability based only upon the signals from sensors 46. However, when stability and flight control are required simultaneously, computer 50 would process all input signals to arrive at control signals which most efficiently accomplish both functions. Thus, the computer 50 can transmit control signals to the actuators for the control surfaces to produce (with minimum drag) under the current flight conditions a wing contour that provides aircraft longitudinal stability and/or a desired flight control movement. Tail control surfaces 42 and 44 would preferably be used for providing lateral-directional stability to aircraft 10.

As an alternate to gain scheduling in the computer 50, or in addition to such gain scheduling, a self adaptive concept can be used. This approach employs incremental movement of selected control surfaces with the resulting aircraft movement monitored and fed back to the computer 50. Based upon these feedback signals, the computer 50 will continually recalculate the optimal positions for the various control surfaces to cause the wing deflection which will result in the desired aircraft control. This could be combined with gain scheduling which would be used for initial positioning of the control surfaces.

The self adaptive concept also allows the system to compensate for a damaged or inoperative control surface. Since such a control surface would not bring about the expected control effect, the computer would search for a combination of control surface movements that does. Conversely, the loss of a control surface, such as an aileron, on a conventional aircraft, will normally severely impact aircraft control.

With the ability to compensate for a damaged or inoperative control surface, the present invention results in another advantage, namely that less control redundancy is required. This would allow additional reductions in weight, complexity, and costs.

Referring again to FIGS. 1 and 2, if the pilot generates a roll command which is intended to cause a certain roll rate, computer 50 will transmit control signals to the various wing flaps (and optionally to the body flaps) to cause the aeroelastic contour of wings 12 and 14 in combination with the wing control surfaces to be such as to result in the desired movement, e.g., by increasing the angle of incidence of wing 14 relative to wing 12. This control technique will be unaffected by aileron reversal. In this regard, the present invention takes advantage of wing flexibility rather than opposing it. The control surfaces are used to twist each wing to obtain the desired wing contours to effect a desired control as opposed to being the primary control surfaces which must overcome opposing aeroelastic wing twist to effect the desired movement. This allows for a lighter weight wing (since less stiffness is required) and the elimination of a rolling tail which also saves weight and reduces aircraft observables.

Figure 4:
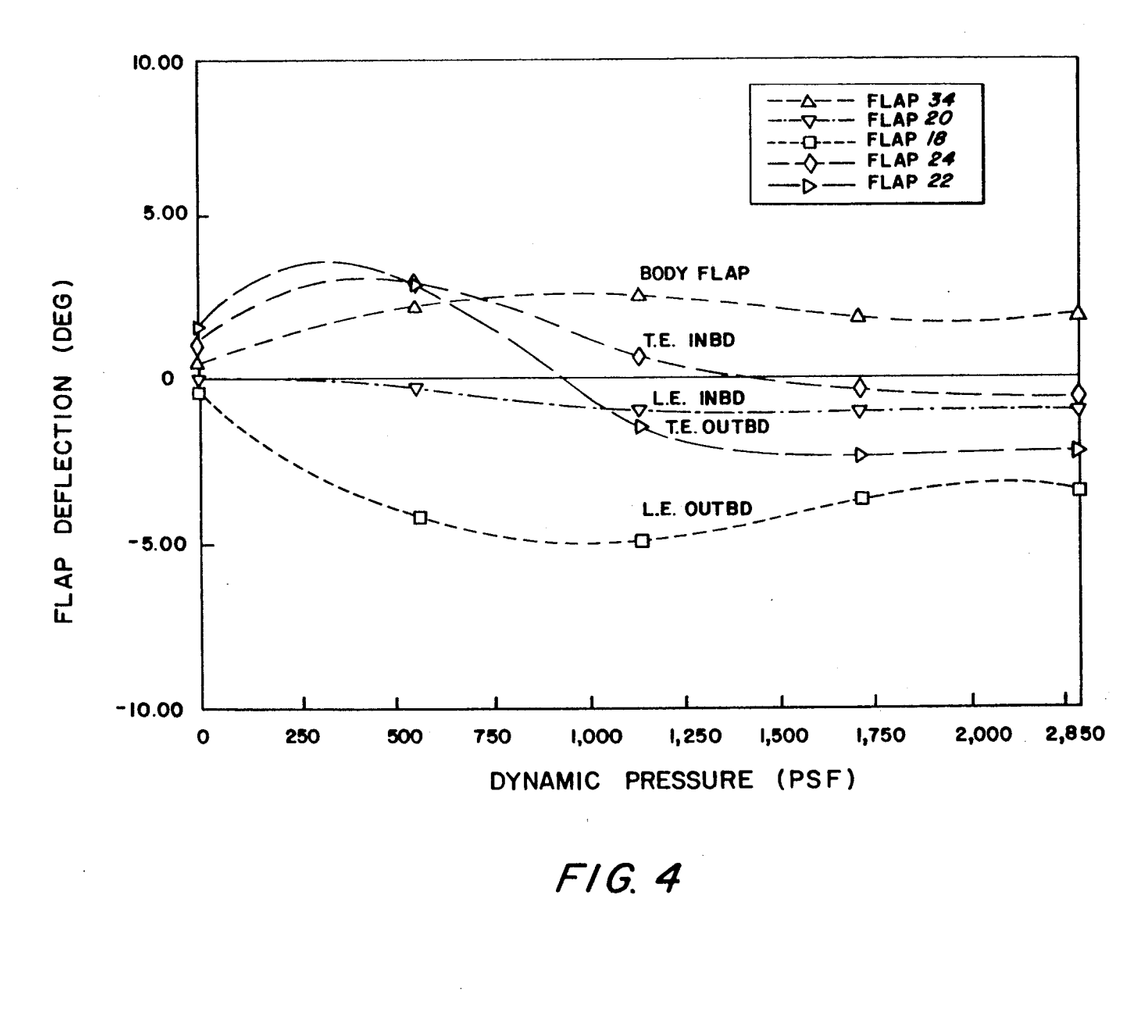
FIG. 4 is a graph of selected control surface deflections vs. dynamic pressure to maintain a selected roll rate with minimum drag under specified conditions for the aircraft of FIG. 1.

FIG. 4 presents a graphic illustration in a particular design case for wing 12 for a sixty-six degree per second roll rate at various dynamic pressures. The control surface deflections were derived based upon acheiving the desired roll rate for minimum drag. It should be noted that the trailing edge control surface deflections reverse direction as dynamic pressure increases. The control surfaces are being used beyond conventional aileron reversal. Also it should be noted that the maximum deflection of any control surface is never more than 5 degrees. Typical trailing edge control surface deflection on a conventional "stiff" wing design would be in a range 30 to 40 degrees to maintain the same roll rate. Thus, the present invention will result in a much lower drag during a maneuver than a conventional design. Also, due to the smaller control surface deflections required, the surface hinge movements will be reduced, resulting in smaller, lighter, and lower power actuators.

Pitch control for aircraft 10 can be accomplished by flaps 34 and 36, or by wings 12 and 14, or by a combination of the body flaps and wings 12 and 14. When wings 12 and 14 are used for pitch control, the wing control surfaces (and optionally flaps 34 and 36) are positioned to cause deflections of the wings 12 and 14 which will bring about the desired pitch. Wing deflections to cause the desired pitch movement are optimally based upon the minimum drag configuration.

The present invention can also be used to provide yaw control, whereby overall control for the aircraft is possible. This is illustrated in the embodiment shown in FIGS. 5 and 6. An aircraft generally indicated at 60 has wings 62 and 64 and a fuselage 66. Mounted on the fuselage are engine inlets 63 and 65. Wing 62 employs leading edge wing control surfaces 68 and 70 and trailing edge wing control surfaces 72, 74, and 75. Wing 64 employs leading edge wing control surfaces 76 and 78 and trailing edge wing control surfaces 80, 82, and 83. Optional body control surfaces 84 and 86 that primarily provide pitch control are also illustrated. The control surfaces are all movable in conventional manner. However, as with aircraft 10, the wing control surfaces are able to deflect above and below the corresponding wing. Also like aircraft 10, aircraft 60 does not include a horizontal tail. Further, aircraft 60 does not include a vertical tail. This again saves overall aircraft weight and reduces aircraft observables.

Figure 5:
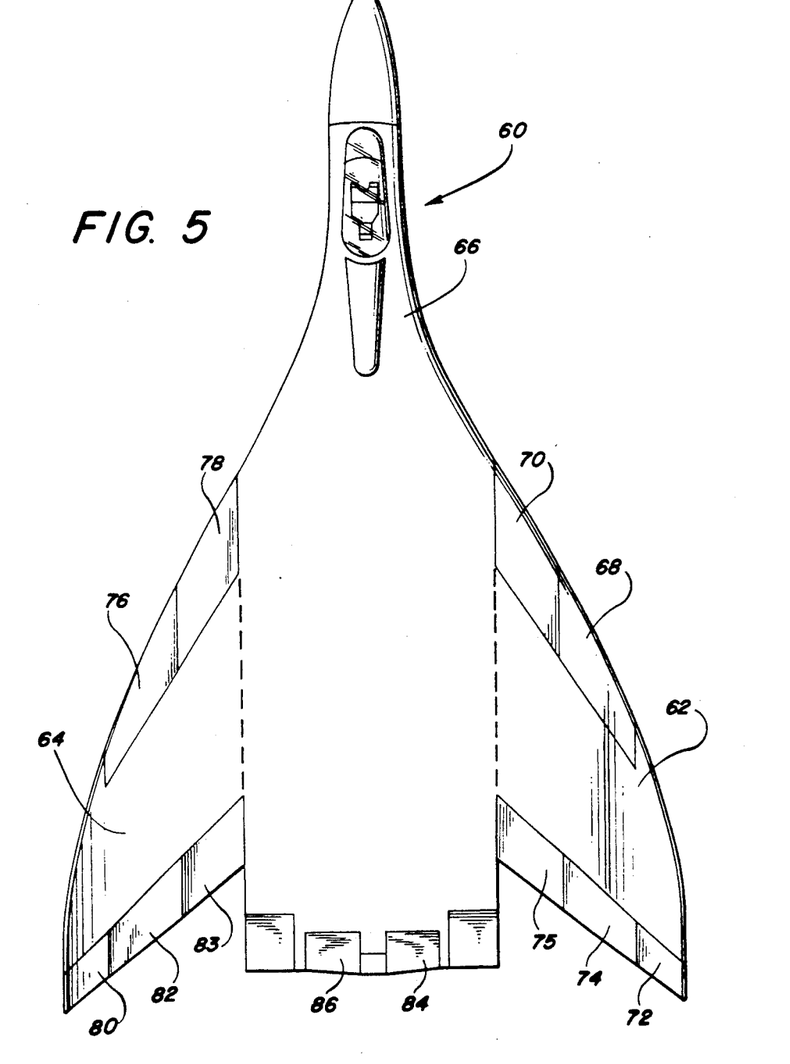
FIG. 5 is a plan view of another embodiment according to the present invention of an aircraft with active flexible adaptive wings.
Figure 6:
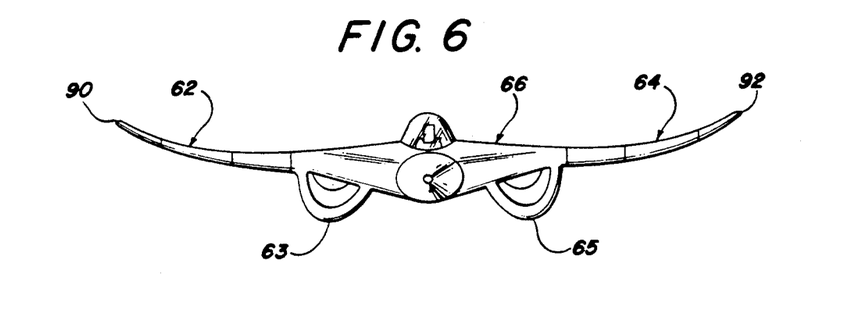
FIG. 6 is a front view of the aircraft of FIG. 5.

Yaw control for aircraft 60 is provided by the wings 62 and 64. In this regard, it should be noted that wings 62 and 64 are permanently bent up in a cresent shape (a span-wise camber). Wings 62 and 64 are still flexible according to the present invention, but would generally maintain the cresent shape whatever the deflections. Wings 62 and 64 could alternately be permantly bent downward in a cresent shape. The cresent shape allows the wings 62 and 64, particularly at the wing tips 90 and 92 respectively, to have a vertical component to effect yaw control. This, wings 62 and 64 can be aeroelastically deflected utilizing the wing control surfaces (and optionally the body 16 control surfaces 84 and 86 as in the embodiment of FIGS. 1-3, for roll and pitch control, longitudinal stability, and to effect yaw control, e.g., by differentially deflecting wing tips 90 and 92. In this embodiment, wings 62 and 64 would also similarly be used to provide active lateral-directional stability augmentation for aircraft 60.

A significant advantage of the present invention is the ability to configure the aircraft wings for substantially optimum performance under different flight conditions. Thus, optimal wing contour for transonic maneuver, supersonic cruise, landing and takeoff, and high speed acceleration vary substantially. The present invention is able to address this problem by significantly varying the shape of wings 12 and 14 as desired based upon pilot or computer control and sensor signals. In this regard, the wings 12 and 14 can be aeroelastically tailored for increased wing flexibility since extra stiffness in the wings mandated by conventional high speed aircraft designs is obviated. As such, there is far more freedom with the current invention to vary wing configuration as desired for the particular flight condition.

Figure 7:
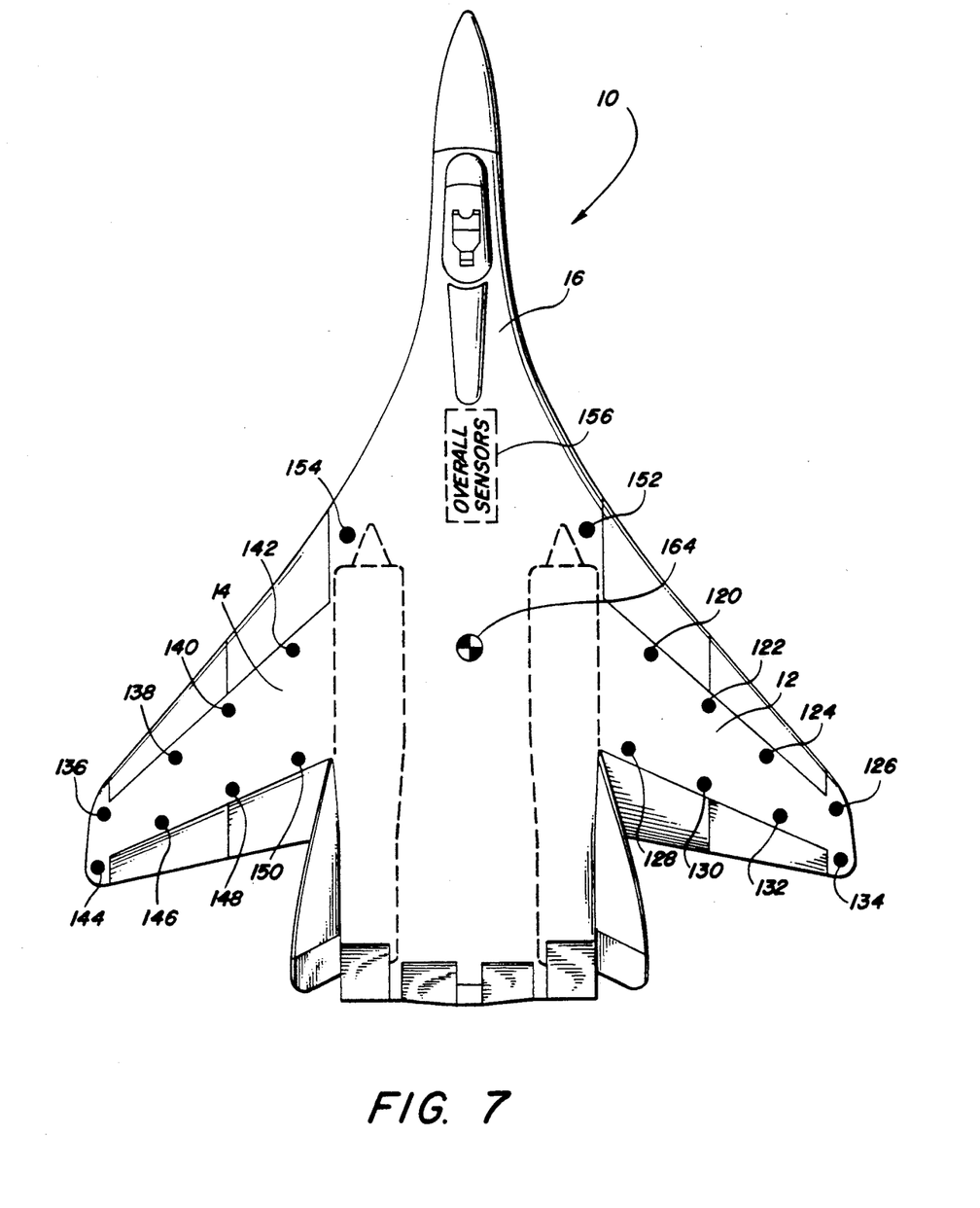
FIG. 7 is a plan view of the aircraft of FIG. 1 showing placement of various sensors.

Referring now to FIG. 7, there is shown a view of the aircraft 10 of FIG. 1 which illustrates an example of the placement of various sensors. While aircraft 10 is illustrated, the approach would also apply to aircraft 60. Sensors 120, 122, 124, and 126 are located near the leading edge of wing 12. Sensors 128, 130, 132, and 134 are located near the trailing edge of wing 12. Sensors 136, 138, 140, and 142 are located near the leading edge of wing 14 and sensors 144, 146, 148, and 150 are located near the trailing edge of wing 14. The sensors on wings 12 and 14 measure motion of the respective portions of the wings where they are located. The wing sensors are preferably linear accelerometers which are positioned to measure vertical acceleration. Aircraft 10 also employs fuselage sensors 152 and 154 which are positioned on the right and left sides of the fuselage respectively. Sensors 152 and 154,which are also preferably linear accelerometers, are spaced equi-distant from the fuselage center line and measure vertical fuselage acceleration so that loads on the wings 12 and 14 can be isolated (from fuselage movement and for asymmetric conditions).

A plurality of other sensors designated 156 are also provided on the aircraft to measure roll, pitch, and yaw movement of the aircraft, lateral movement of the fuselage, mach number, and altitude. The nominal c.g. 164 for the aircraft is also illustrated. The term "nominal" is used since during flight, the aircraft actual center of gravity will shift, i.e., due to fuel usage. Accordingly what is meant by "nominal" is the average location of the center of gravity during flight.

Figure 8:
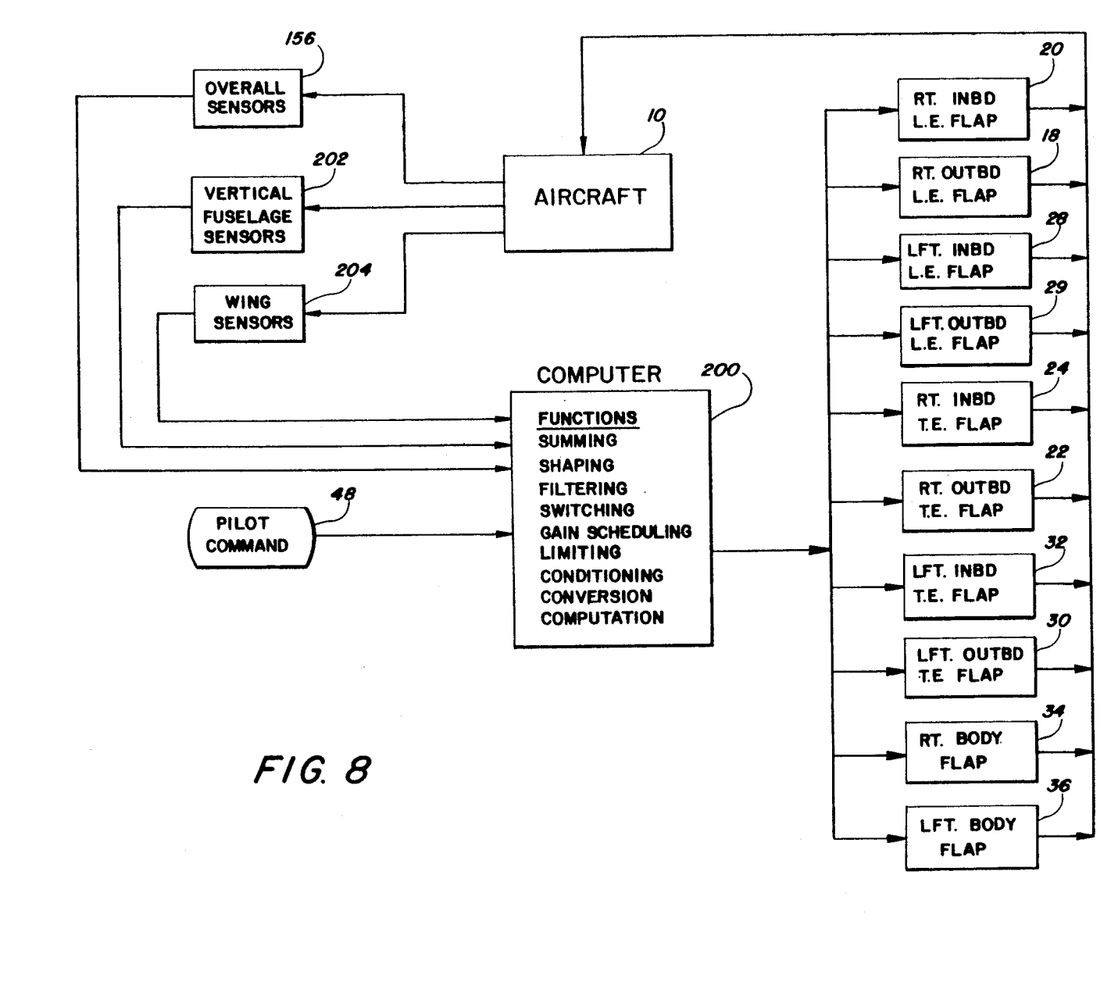
FIG. 8 is a block diagram of a control system which incorporates gust load alleviation stability augmentation, flutter suppression, and maneuver load control.

FIG. 8 illustrates a block diagram of an enhanced control system for aircraft 10 which incorporates the ability to compensate for maneuver load control, gust load alleviation, and flutter supression. Such a system allows for further reductions in wing weight and stiffness. Computer 200 receives pilot command signals 48 (when transmitted by the pilot or an automatic pilot) and signals from the overall sensors 156, vertical fuselage sensors 202, and wings sensors 204. Vertical fuselage sensors 202 encompass sensors 152 and 154 illustrated in FIG. 7, while wing sensors 204 encompass sensors 120, 122, 124, 126, 128, 130, 132, 134, 136, 138, 140, 142, 144, 146, 148, and 150, also illustrated in FIG. 7.

When no maneuver load control, gust load alleviation, or flutter supression is required, computer 200 will in response to sensors 156 and pilot command signal 48 perform the functions listed to compute optimal flap movements to cause the wing flexure which will maintain stability, produce desired control movements, and bring about optimum wing configuration for the particular flight conditions, e.g., supersonic cruise. Control signals from computer 200 are subsequently transmitted to acutators (not shown) for each of the respective flaps 18, 20, 22, 24, 28, 29, 30, 32, 34, and 36 which is to be rotated from its current position. As previously discussed, movement of these flaps produces aerodynamic loads on the wings 12 and 14 which cause the wings to deflect so that each of the wings 12 and 14 has an overall contour that will produce the desired control movement (or stability augmentation) and optimum wing configuration for the flight conditions. Gain scheduling by computer 200 is preferably based upon providing optimum wing shape for the wings 12 and 14 for minimum drag for the given flight conditions (and to effectuate any stability augmentation and desired control movements).

When maneuver load control, gust load alleviation, or flutter suppression is necessary as determined by computer 200 based upon the signals from sensors 202 and 204, such as where wing 12 and/or wing 14 have been deflected due to flutter, gusts, and or maneuver loads, the computer 200 also processes such signals in combination with the signals from overall sensors 156 and any pilot command signal 48 to compute movements for the flaps. Thus, computed flap movements to effect stability augmentation and/or a desired control movement would be combined with computed flap movements necessary to compensate for maneuver load control, gust alleviation, or flutter suppression. If no control movement or stability augmentation is required at a given time when flutter suppression, maneuver load control, or gust alleviation is required, then the flaps will be moved by computer 200 solely to offset the detected maneuver loads, gusts, or flutter.

A self adaptive concept as discussed with reference to FIG. 3 may alternately or preferably be used in combination with gain scheduling for computer 200. For desired control movements or optimum configuration for a given flight condition, the computer 200 would use feedback of resulting aircraft movement. For gusts, flutter, and maneuver loads, computer 200 would use feedback from the wing sensors to determine impact of the flap movements.

Thus, it is apparent that there has been provided, in accordance with the invention, an Aircraft Control System that fully satisfies the objectives, aims, and advantages set forth above. While the invention has been described in conjuction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. A system for control of an aircraft in one or more of its axes comprising:
   flexible wings;
   flight control surfaces mounted on said flexible wings;
   aircraft sensors for providing signals indicative of the overall motion of the aircraft;
   processing means responsive to said signals from said aircraft sensors for determining control surface movements which will aeroelastically induce desired deflections in said wings to effect the desired control of the aircraft and selectively generating control signals to bring about said control surface movements; and
   control means receiving said control signals from said processing means for moving said control surfaces in accordance with said control signals in a manner to aeroelastically induce said desired deflections of said flexible wings to produce said desired control of the aircraft.

2. The system of claim 1, wherein the system provides for roll control of the aircraft.

3. The system of claim 1, wherein the system provides for pitch control of the aircraft.

4. The system of claim 2, wherein the system also provides for pitch control of the aircraft.

5. The system of claim 4, wherein the system also provides for yaw control of the aircraft.

6. The system of claim 2, wherein the roll control is provided in the manner set forth under conditions of and beyond aileron reversal.

7. The system of claim 4, wherein the roll control is provided in the manner set forth under conditions of and beyond aileron reversal.

8. The system of claim 5, wherein the roll control is provided in the manner set forth under conditions of and beyond aileron reversal.

9. The system of claim 1, wherein said processing means generates said control signals for movement of said control surfaces which will bring about the desired control by said aeroelastically induced deflections in said wings.

10. The system of claim 1, wherein the aircraft is without a horizontal tail or canard.

11. The system of claim 2, wherein the aircraft is without a horizontal tail or canard.

12. The system of claim 3, wherein the aircraft is without a horizontal tail or canard.

13. The system of claim 4, wherein the aircraft is without a horizontal tail or canard.

14. The system of claim 5, wherein the aircraft is without a horizontal tail or canard.

15. The system of claim 1, wherein the leading and trailing edges of said wings have at least one of said flight control surfaces mounted thereon, and said flight control surfaces are mounted to allow for their deflection above and below the wing to which they are mounted.

16. The system of claim 1, wherein said control signals are such that said control means moves said control surfaces to cause said wings to aeroelastically deflect such that said desired control of the aircraft is effected with substantially minimum drag.

17. The system of claim 2, wherein said control signals are such that said control means moves said control surfaces to cause said wings to aeroelastically deflect such that said desired control of the aircraft is effected with substantially minimum drag.

18. The system of claim 3, wherein said control signals are such that said control means moves said control surfaces to cause said wings to aeroelastically deflect such that said desired control of the aircraft is effected with substantially minimum drag.

19. The system of claim 4, wherein said control signals are such that said control means moves said control surfaces to cause said wings to aeroelastically deflect such that said desired control of the aircraft is effected with substantially minimum drag.

20. The system of claim 5, wherein said control signals are such that said control means moves said control surfaces to cause said wings to aeroelastically deflect such that said desired control of the aircraft is effected with substantially minimum drag.

21. The system of claim 6, wherein said control signals are such that said control means moves said control surfaces to cause said wings to aeroelastically deflect such that said desired control of the aircraft is effected with substantially minimum drag.

22. The system of claim 9, wherein said control signals are such that said control means moves said control surfaces to cause said wings to aeroelastically deflect such that said desired control of the aircraft is effected with substantially minimum drag.

23. The system of claim 1, wherein said processing means also selectively generates performance signals relative to control surface movements to aeroelastically induce desired wing defections to effect a configuration for said wings substantially optimized for the flight conditions; and wherein said control means is also for moving said control surfaces in a manner responsive to said performance signals to cause said wings to be aeroelastically deflected into a configuration substantially optimized for the flight conditions.

24. The system of claim 1, also including command means generating signals for said aircraft control, and wherein said processing means is responsive to said signals from said command means.

25. The system of claim 16, wherein said aircraft sensors sense mach number, aircraft attitude, and altitude.

26. The system of claim 16, also including wing sensors for providing signals indicative of motion of said wings, and wherein said processing means is also responsive to said signals from said wing sensors.

27. The system of claim 1, also including wing sensors for providing signals indicative of motion of said wings, and wherein said processing means is also responsive to said signals from said wings sensors, and wherein said processing means compensates for damaged or inoperative control surfaces which fail to aeroelastically induce deflection in said wings to bring about the desired control of the aircraft.

28. The system of claim 10, wherein the aircraft is without a vertical tail.

29. The system of claim 5, wherein the aircraft is without a vertical tail, horizontal tail, or canard.

30. The system of claim 1, wherein said processing means also selectively generates control signals relative to control surface movements to aeroelastically induce desired wing deflections to maintain stability of the aircraft, and wherein said control means also moves said control surfaces in accordance with said control signals in a manner to aeroelastically induce said desired wing deflections to maintain stability of the aircraft.

31. The system of claim 10, wherein said processing means also selectively generates control signals relative to control surface movements to aeroelastically induce desired wing deflections to maintain stability of the aircraft, and wherein said control means also moves said control surfaces in accordance with said control signals in a manner to aeroelastically induce said desired wing deflections to maintain stability of the aircraft.

32. The system of claim 16, wherein said aircraft has a fuselage, said fuselage is mounted to said wings, and also including fuselage flight control surfaces and a second control means, said fuselage flight control surfaces mounted to the aircraft fuselage, said processing means also generates second control signals, said second control means being responsive to said second control signals for moving said fuselage flight control surfaces, said fuselage flight control surfaces working in combination with said flight control surfaces on said wing to effect said desired control of the aircraft, said second control signals being such that in combination with said first control signals, said control of the aircraft is effected with substantially minimum drag.

33. A method for control of an aircraft having flexible wings and flight control surfaces mounted on the wings, in one or more of the axes of the aircraft, comprising:
sensing overall motion of the aircraft;
determining desired control of the aircraft;
determining control surface movements in response to said desired control of the aircraft and said sensed overall motion of the aircraft which will aeroelastically induce desired wing deflections to produce said desired control;
generating control signals to bring about said control surface movements; and
moving the control surfaces on said wings in response to said control signals in a manner to aeroelastically induce said desired deflections in said wings to produce said desired control of the aircraft.

34. The method of claim 33, wherein said system is for roll and pitch control of the aircraft.

35. The method of claim 33, also including generating command signals for said control of the aircraft, and wherein said moving the control surfaces is also in response to said command signals.

36. The method of claim 33, also including generating command signals for control of the aircraft, and wherein said moving the control surfaces is also in response to said command signals.

37. The method of claim 33, wherein said moving the control surfaces is in a manner to aeroelastically deflect said wings to effect the desired control of the aircraft with substantially minimum drag.

38. The method of claim 34, wherein said moving the control surfaces is in a manner to aeroelastically deflect said wings to effect the desired control of the aircraft with substantially minimum drag.

39. The method of claim 35, wherein said moving the control surfaces is in a manner to aeroelastically deflect said wings to effect the desired control of the aircraft with substantially minimum drag.

40. The method of claim 34, wherein said roll control is provided in the manner set forth under conditions of and beyond aileron reversal.

* * * * *